(12) United States Patent
Carey et al.

(10) Patent No.: US 11,995,032 B2
(45) Date of Patent: May 28, 2024

(54) REDUCED-LATENCY DATA OPERATIONS FOR FILES IN A FILE SYSTEM

(71) Applicant: MICROSOFT TECHNOLOGY LICENSING, LLC, Redmond, WA (US)

(72) Inventors: Omar Carey, Redmond, WA (US); Rajsekhar Das, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 115 days.

(21) Appl. No.: 16/411,131

(22) Filed: May 13, 2019

(65) Prior Publication Data

US 2020/0364180 A1 Nov. 19, 2020

(51) Int. Cl.
*G06F 15/16* (2006.01)
*G06F 16/11* (2019.01)
*G06F 16/13* (2019.01)
*G06F 21/62* (2013.01)

(52) U.S. Cl.
CPC ............ *G06F 16/122* (2019.01); *G06F 16/13* (2019.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 2002/0078239 | A1* | 6/2002 | Howard | G06F 16/134 709/245 |
| 2004/0221125 | A1* | 11/2004 | Ananthanarayanan | G06F 3/0643 711/203 |
| 2004/0260673 | A1* | 12/2004 | Hitz | G06F 11/1435 |

(Continued)

OTHER PUBLICATIONS

Messurier. Resilient File Systems (ReFS)—What is it and how does it work? https://www.ontrack.com/en-gb/blog/, 2015, pp. 1-4. ( Year: 2015).*

(Continued)

*Primary Examiner* — Alex Gofman
*Assistant Examiner* — Shelly X Qian
(74) *Attorney, Agent, or Firm* — Newport IP, LLC; Jacob P. Rohwer (57) ABSTRACT

Methods, systems, and computer storage media for providing reduced-latency data operations for data or storage in file systems. The file system implements a set of policies that indicate how data operations are performed. In operation, a request for access to storage of a file system to perform a data operation is received. The file system supports both a bitmap representation and a range-only representation of the storage. A bitmap representation of a region for performing the data operation is communicated because, for certain data operations, the file system operates based on communicating only bitmap representations while restricting access to range-only representations. The range-only representations are a compacted representation of storage of the file system. Based on the bitmap representation of the region, the storage of the file system is accessed. The bitmap representation of (Continued)

the region further includes a bitmap lock that restricts access to storage corresponding to the bitmap representation.

17 Claims, 6 Drawing Sheets

(56) References Cited

U.S. PATENT DOCUMENTS

2007/0266037 A1\* 11/2007 Terry .................. G06F 3/0607
2011/0131387 A1 6/2011 Bacik

OTHER PUBLICATIONS

Burns, et al., "A Bit-Parallel Search Algorithm for Allocating Free Space", In Proceedings of the 9th International Symposium in Modeling, Analysis and Simulation of Computer and Telecommunication Systems, Aug. 15, 2001, pp. 302-310.
"International Search Report and Written Opinion Issued in PCT Application No. PCT/US20/031941", dated Aug. 12, 2020, 14 Pages.
Sehgal, et al., "An Empirical Study of File Systems on NVM", In Proceedings of the 31st Symposium on Mass Storage Systems and Technologies, May 30, 2015, 14 Pages.
Verma, Surendra, "Building the Next Generation File System for Windows: ReFS", Retrieved from: https://docs.microsoft.com/en-us/archive/blogs/b8/building-the-next-generation-file-system-for-windows-refs, Jan. 16, 2012, 12 Pages.
"Office Action Issued in European Patent Application No. 20728617.0", dated Sep. 1, 2023, 7 Pages.

\* cited by examiner

REDUCED-LATENCY DATA OPERATIONS FOR FILES IN A FILE SYSTEM

BACKGROUND

Users rely on file systems for organizing data and files on computing systems. A file system, such as a resilient file system (ReFS), provides structure and logic rules to manage storage and retrieval, and, naming and grouping of data. For example, a file system, such as ReFS, can operate using different types of locks (e.g., global locks, allocator locks, and cache locks) that restrict access to a file by allowing only one process to access the file at a specific time. Locks can cause sequential (or serialized) access to files and thus latency, where a subsequent request for access to a file is delayed while an initial request for access to the file is being executed. As more and more functionality are supported using file systems, data operations with reduced-latency is important to improve file access performance in a file system.

SUMMARY

Various aspects of the technology described herein are generally directed to systems, methods, and computer storage media, for among other things, providing reduced-latency data operations for data (unallocated storage and allocated storage for metadata, directories, and files) in a file system. In particular, the file system implements a set of policies that indicate (and change) how data operations are performed. To simplify the detailed explanation below, the set of policies can be referred to as the following: a storage-representation usage policy, a bitmap-representation conversion policy, and a bitmap-locking policy that are implemented as changes to the file system. These changes, when performing data operations, reduce latency associated with the current operations (i.e., data operations) in the file system that modify storage locations.

By way of background, a file system (e.g., a resilient file system—ReFS) can provide the structure and logic rules used to manage storing and retrieving data, and naming and grouping data. Latency in a conventional file system may be caused by several aspects of the file system (e.g., legacy features and updated features) including: the different ways of representing storage locations in the file system, the timing and the rights to modify storage in the file system, and the types of locks and corresponding locking logic for implementing locks in the file system. At a high level, in conventional systems, the features identified above allow the file system to perform data operations with some flexibility (i.e., flexible operations) in that data operations can be performed in variety of different ways. For example, flexible operations can include allowing access to both a bitmap representation and a range-only representation of storage for performing data operations; allowing unrestricted conversion of bitmap regions to range-only regions; and allowing broad locking operations. These flexible operations result in a subsequent request for access to data being delayed while an initial request for access to the data is being executed. In this way, while the flexible operations in conventional file systems allow the file system to operate without certain conditions, regulations, or limitations, the file system suffers from latency in that these flexible operations create numerous circumstances of serialized access to data. As such, an alternative approach for performing data operations for files in a file system to reduce latency would improve computing operations for file access performance in a file system.

Aspects of the technical solution described in the present disclosure are directed towards improving file systems based on providing reduced-latency data operations for data (unallocated storage and allocated storage for metadata, directories, and files) in a file system. In particular, the file system implements a set of policies that indicate (and change) how data operations are performed. For example, a storage-representation usage policy, a bitmap-representation conversion policy, and a bitmap-locking policy are implemented, when performing data operations, in order to reduce latency associated with the current data operations of the file system. The storage-representation usage policy restricts access to only bitmap representations of regions of data for certain data operations, even though the file system provides access to storage based on both the bitmap representation and the range-only representation. The bitmap-representation conversion policy restricts when changes to the bitmap representation for regions of storage can be performed. In particular, changes to the bitmap representation can be made only after the state of the data of the file system has been synchronized with a previous checkpoint on disk based on cached data and the data on disk (e.g., global drain exclusive checkpointing operation). Further, the bitmap representation conversion policy may also prevent a bitmap representation from being converted to a range-only representation even under a global exclusive drain based on bitmap lock (or flag). The flag indicates that a caller can hold on to a data region of the bitmap representation past checkpoint boundaries. And, the bitmap-locking policy allows a data operation to lock the specific bitmap that is being accessed (i.e., a bitmap lock), while other locks (i.e., global locks or cache locks) are dropped to prevent any latency that would have otherwise been caused by having the other locks instead of just the bitmap lock.

In operation, a request for access to storage of a file system to perform a data operation is received. Storage can broadly refer to unallocated storage and allocated storage for metadata, directories, and files for the data operation. Different types of data operations can be performed using storage allocations that are allocations for copying data when making modifications to the data (i.e., copy-on-write). The file system supports both a bitmap representation and a range-only representation of the storage. A bitmap representation of a region for performing the data operation is communicated because, for certain data operations, the file system operates based on communicating only bitmap representations while restricting access to range-only representations of storage of the file system. The range-only representations are a compacted representation of storage of the file system that optimize how storage is represented. Range-only representations can be reserved for an allocator that selectively and strategically uses the range-only representations with minimal or no latency impact on the file system. Based on the bitmap representation of the region, the storage of the file system is accessed. The bitmap representation of the region further is associated with bitmap lock that restricts access to storage corresponding to the bitmap representation, where the bitmap lock allows a caller to drop global locks or cache locks that would otherwise block other data operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Overview of Aspects of the Technological Improvement

A file system, such as a resilient file system (ReFS), provides structure and logic rules to manage storing and retrieving data, and naming and grouping data. For example, a file system, such as ReFS, provides allocators (e.g., global and local allocators) that support a volume for directories and files in the file system, where an allocator of the file system is represented as a B+ tree of B+ tables on disk. B+ tables provide certain performance advantages when implemented on disk. Compared to B+ tables on disk, B+ for in-memory computing does not provide the same performance advantages, even though in-memory computing allows for faster computing operations on data. In this way, if the data is in a B+ table data structure while in-memory, the performance advantages of in-memory computing are lost, unless other types of data structures are used in-memory. As such, the file system further implements different caching data structures (e.g., in-memory cache) to take advantage of in-memory computing functionality. Data operations are perform using storage-representations of disk storage that are accessed either accessed using the cache or directly through disk storage.

With reference to storage-representations (e.g., bitmap representation or range-only representation), in operation, an allocator assigns regions on disk for storing data. An allocator region may have a default size. For example, an allocator region may be an integer multiple of 64 MB. Regions (e.g., 64 MB) on the disk can oftentimes have some mix of allocated blocks and unallocated blocks such that a bitmap representation of the region is provided. Bits in an allocated region can correspond to one cluster of a region on the disk. Regions can be split and spliced together, which changes the structure of the tree holding the regions in storage; thus either a cache or allocator lock is held, while a thread has a pointer to the region for performing a data operation. An allocator can specifically support bitmap regions in the bitmap representation and range-only regions in range-only representation.

With reference to a bitmap representation, by way of example, for a bitmap region that is fully allocated or fully free, the bitmap representation of the 64 MB of blocks takes up space additional overhead space. A bitmap region may take up 2 KB on disk, causing the 2 KB of space to not be used for another purpose. However, a fully free or fully allocated bitmap can be otherwise easily identified, as fully free or fully allocated, without the overhead. A bitmap may be for a band (contiguous range of storage) of data where the band of data is fully allocated or fully free in a file system. Bands can be stored more efficiently in the range-only representation compared to the bitmap representations. Range-only regions can be implemented as an optimization. The optimization here (i.e., compaction) introduces range-only regions that are associated with an indicator denoting the range is fully free or fully allocated. In other words, the file system takes regions that are fully free or fully allocated and puts them in a more compact form with indicators, to save on overhead associated with bitmap representations. As such, either bitmap representations or range-only representation can be used to represent storage in a file system.

Modifying data in the file system, using the cache or on disk, can be based on locks and a locking logic of the file system. The file system can retrieve and store data based on locks (e.g., global locks or cache locks). For example, a global allocator for a set of global tables of the file system can use a global lock to synchronize file system data based on cached data and the data on disk (e.g., a global drain exclusive checkpointing operation). In addition to the global locks, a file system further implements cache locks that restrict access to data by allowing only one process to access the data at a specific time. These locks can cause serialized access to data and thus latency, where a subsequent request for access to data is delayed, while an initial request for access to the data is being executed.

Latency in a conventional file system may be caused by several features of the file system including the storage-representation used to represent data stored in the file system, the timing and the rights to modify data in the file system, and the types of locks and corresponding locking logic for implementing locks in the file system. The features identified above allow the file system to perform data operations with some flexibility (i.e., flexible operations) in that data operations can be performed in variety of different ways. While the flexible operations of a conventional file system allow the file system to operate without certain conditions, regulations, or limitations, the file system suffers from latency in that these flexible operations create numerous circumstances of serialized access to data. For example, flexible operations can include the following: allowing access to both a bitmap representation and a range-only representation for performing data operations; allowing unrestricted conversion of bitmap regions to range-only regions; and allowing broad locking operations. These flexible operations result in a subsequent request for access to data being delayed while an initial request for access to the data is being executed. As such, an alternative approach for reducing latency for data operations for files in a file system would improve computing operations for file access performance in a file system.

Embodiments of the present invention are directed to simple and efficient methods, systems, and computer storage media for providing latency-reducing data operations for files in a file system. In particular, the file system implements a set of policies that indicate (and change) how data operations are performed. For example, a storage-representation usage policy, a bitmap-representation conversion policy, and a bitmap-locking policy are implemented, when performing data operations, in order to reduce latency associated with the current data operations of the file system. The storage-representation usage policy restricts access to only bitmap representation of regions of data for certain data operations, even though the file system stores data in both the bitmap representation and a range-only representation. The bitmap-representation conversion policy restricts when changes to the bitmap representation for regions of storage can be performed. In particular, changes to the bitmap representation can be made only after the state of the data of the file system has been synchronized with a previous checkpoint on disk based on cached data and the data on disk (i.e., global drain exclusive checkpointing operation). Further, the bitmap representation conversion policy may also prevent a bitmap representation from being converted to a range-only representation even under a global exclusive drain based on bitmap lock (or flag). The flag indicates that a caller can hold on to a data region of the bitmap representation past checkpoint boundaries. And, the bitmap-locking policy allows a data operation to lock only the bitmap that is being accessed (i.e., bitmap lock), while global locks are dropped to prevent any latency that would have otherwise been caused by having a global lock instead of just the bitmap lock.

Figure 1:
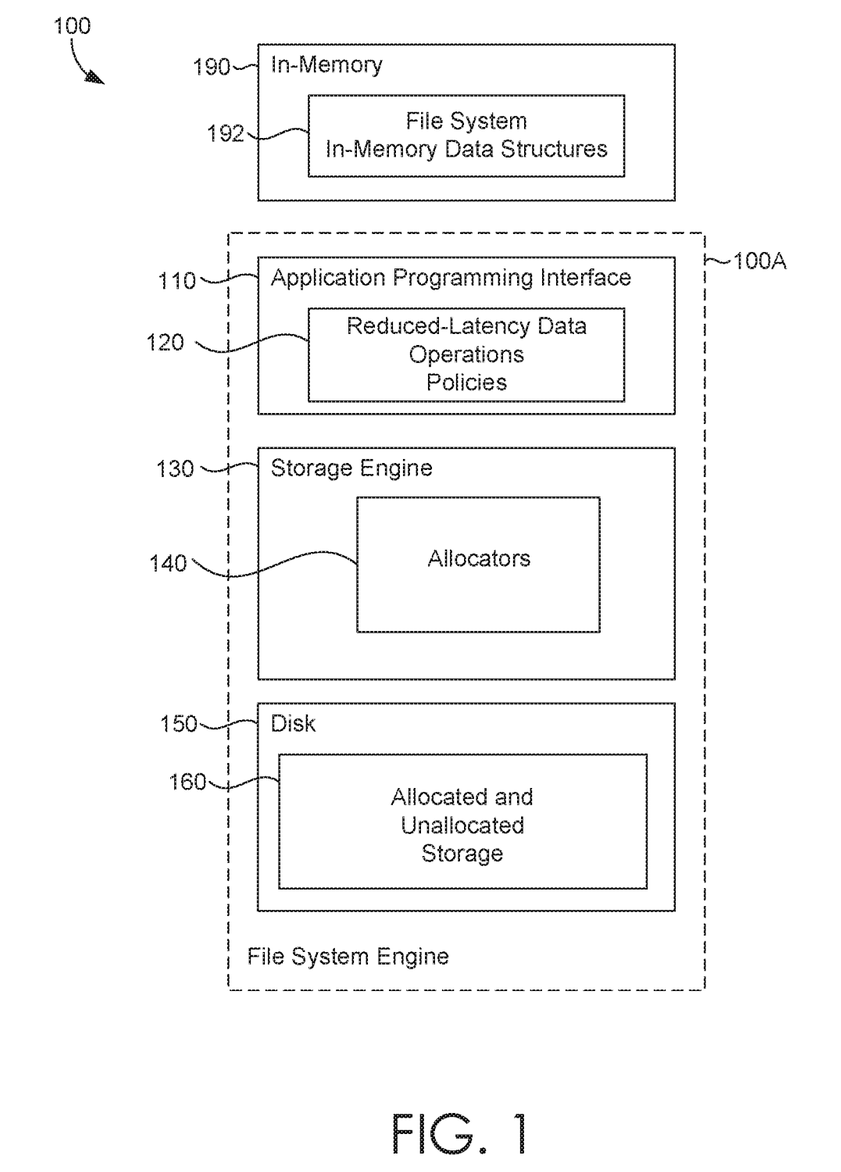
FIG. 1 is a block diagram of an exemplary environment for providing reduced-latency data operations for files in a file system, suitable for use in implementing aspects of the technology described herein.

Aspects of the technical solution can be described by way of examples and with reference to a file system operating environment in FIG. 1. The file system engine 100A typically manages operations, such as storage management, file naming, directories or folders, metadata, access rules and privileges. FIG. 1 includes an Application Programming Interface 110 including reduced-latency data operations policies 120; storage engine 130 including allocators 140; disk including storage allocations 160.

In operation, a request for access to storage (e.g., disk 150 having allocated and unallocated storage 160) of the file system to perform a data operation is received. The file system supports both a bitmap representation and a range-only representation of the storage. As used herein, the bitmap representations and range-only representations are in-memory representations of the storage as B+ tables on disk. A bitmap representation includes a plurality of bits representing corresponding cluster regions of the storage. The range-only representation includes a contiguous range of fully allocated or fully free regions of the storage.

The bitmap representation or the range-only representation of storage can be used to perform data operations. The data operation can be a restricted data operation or an unrestricted data operation. Restricted operations, by policy, cannot have access to bitmap representations of storage, while an unrestricted operation may have access to either the bitmap representation or range-only representation. In particular, a data operation is a restricted data operation because of the copy-on-write policy of the file system, which requires the data operation to copy the data when modifying the data, requiring a lock on the data, which may cause latency. A data operation is an unrestricted data operation for certain internal operations of an allocator, which can take advantage of the storage benefits of representing the storage in the range-only representation. In this way, the restricted data operations are allowed access to only bitmap representations of the storage and unrestricted data operations are allowed access to either the bitmap representation or the range-only representations of the storage of the file system.

Based on receiving the request to access storage, a bitmap representation of a region for performing the data operation is communicated. In particular, for data operations, the file system operates based on communicating only bitmap representations while restricting access to range-only representations of storage of the file system. The range-only representations are a compacted representation of storage of the file system. Communicating the bitmap representation further comprises converting a range-only representation of the region to the bitmap representation of the region.

Communicating the bitmap representation of the region further causes a drop of at least one lock associated with the request to perform the data operation. For example, a data operation having a global lock or a cache lock may drop the global and cache locks to perform the data operation using the bitmap representation that has been communicated. Moreover, the bitmap representation of the region comprises (is associated with) a bitmap lock that restricts access to storage corresponding to the bitmap representation. Based on the bitmap representation of the region, the storage of the file system is accessed. To further provide, latency-reduced data operations, it is contemplated that the bitmap representation cannot be converted to the range-only representation of the storage unless a global drain exclusive has been acquired. In this way, only during flush operations that lock out the majority of operations can the conversion be made to obviate any latency or blocking. Moreover, the bitmap representation conversion policy may also prevent a bitmap representation from being converted to a range-only representation even under a global exclusive drain based on bitmap lock (or flag). The flag indicates that a caller can hold on to a data region of the bitmap representation past checkpoint boundaries. When the caller is allowed to hold on to the data region, this operation reduces data latency by allowing a checkpoint operation to proceed while guaranteeing memory safety. The checkpoint operation will not remove a bitmap pointer because for underneath the call because the checkpoint point operation is converting the bitmap point to range-only. For example, for a container rotation operation (e.g., a two tier volume rotation operation moving data from a first tier to a second tier) that needs to read/write 64MB of data, the container rotation operation may cause a high latency spike if the container operation has to perform multiple read/writes while blocking a volume checkpoint operation from proceeding.

Aspects of the technical solution of this disclosure have been described with reference to several inventive features and advantages associated with a file system that improves providing reduced-latency data operations for data (unallocated storage and allocated storage for metadata, directories, and files) in a file system. A set of policies are implemented to improve on data operations that manage metadata, in particular, improving (i.e., optimizations) based on implementing more efficient locking mechanisms that are supported in the file system. Improving on conventional locking mechanisms can minimize the amount of time required for accessing and modifying metadata, while additionally isolating these operations from impacting other file system operations. For example, in a conventional system, flushing metadata (based on acquiring a lock) may block other data operations (e.g., directory create, file create, or write to file) or introduce latencies in the file system. Overall, a practical application of aspects of the technical solution described results in improvements based on less CPU computation, smaller memory requirements, and increased flexibility in file systems over conventional non-hard-link implementations.

Figure 2:
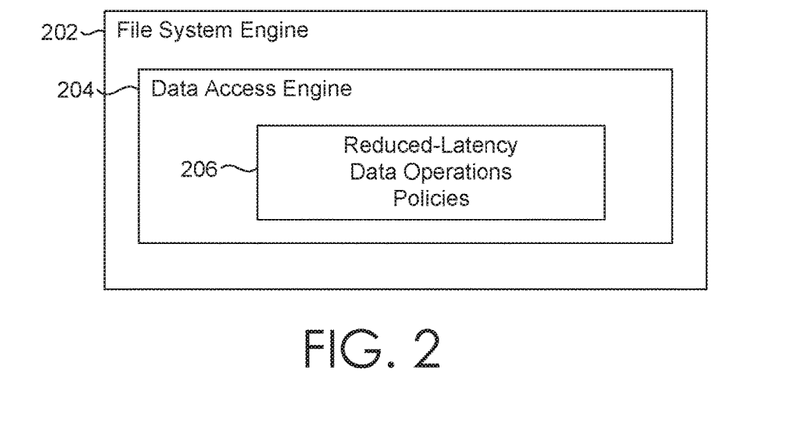
FIG. 2 is an exemplary file system engine in accordance with aspects of the technology described herein.

Overview of Example Environments for Providing Reduced-Latency Data Operations for Files in File Systems Turning to FIG. 2, a block diagram of an exemplary technical solution environment (file system environment 200) suitable for use in implementing embodiments of the technical solution are shown. Generally the technical solution environment includes a technical solution system suitable for providing reduced-latency data operations for files in file systems. The file system environment 200 includes a file system engine 202 having a data access engine 204 including a reduced-latency data operations policies 206.

The data access engine 204 is responsible for receiving a request for access to storage (e.g., disk 150 having allocated and unallocated storage 160) of the file system to perform a data operation is received. The file system supports both a bitmap representation and a range-only representation of the storage. As used herein, the bitmap representations and range-only representations are in-memory representations of the storage as B+ tables on disk. A bitmap representation includes a plurality of bits representing corresponding cluster regions of the storage. The range-only representation includes a contiguous range of fully allocated or fully free regions of the storage. The bitmap representation or the range-only representation of storage can be used to perform data operations.

The data operation can be a restricted data operation or an unrestricted data operation. A data operation is a restricted data operation because of a copy-on-write policy of the file system. A data operation is an unrestricted data operation for certain internal operations of an allocator. The restricted data operations are allowed access to only bitmap representations of the storage and unrestricted data operations are allowed access to either the bitmap representation or the range-only representations of the storage of the file system. A bitmap representation of a region for performing the data operation is communicated. In particular, for data operations, the file system operates based on communicating only bitmap representations while restricting access to range-only representations of storage of the file system. The range-only representations are a compacted representation of storage of the file system.

The data access engine 204 is further responsible for communicating the bitmap representation further comprises converting a range-only representation of the region to the bitmap representation of the region. Communicating the bitmap representation of the region further causes a drop of at least one lock associated with the request to perform the data operation. It is contemplated that the bitmap representation cannot be converted to the range-only representation of the storage unless a global drain exclusive has been acquired. Further, the bitmap representation conversion policy may also prevent a bitmap representation from being converted to a range-only representation even under a global exclusive drain based on bitmap lock (or flag). The flag indicates that a caller can hold on to a data region of the bitmap representation past checkpoint boundaries. The bitmap representation of the region comprises a bitmap lock that restricts access to storage corresponding to the bitmap representation. Based on the bitmap representation of the region, the storage of the file system.

Figure 3:
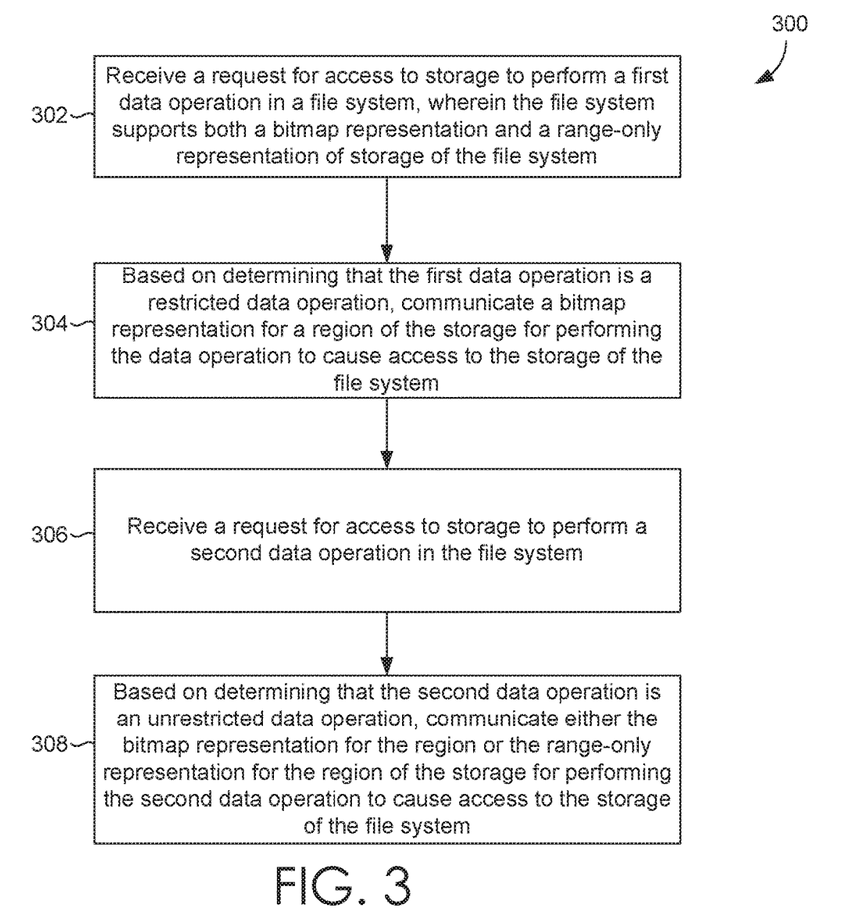
FIG. 3 provides a first exemplary method of providing reduced-latency data operations for files in a file system in accordance with aspects of the technology described herein.
Figure 4:
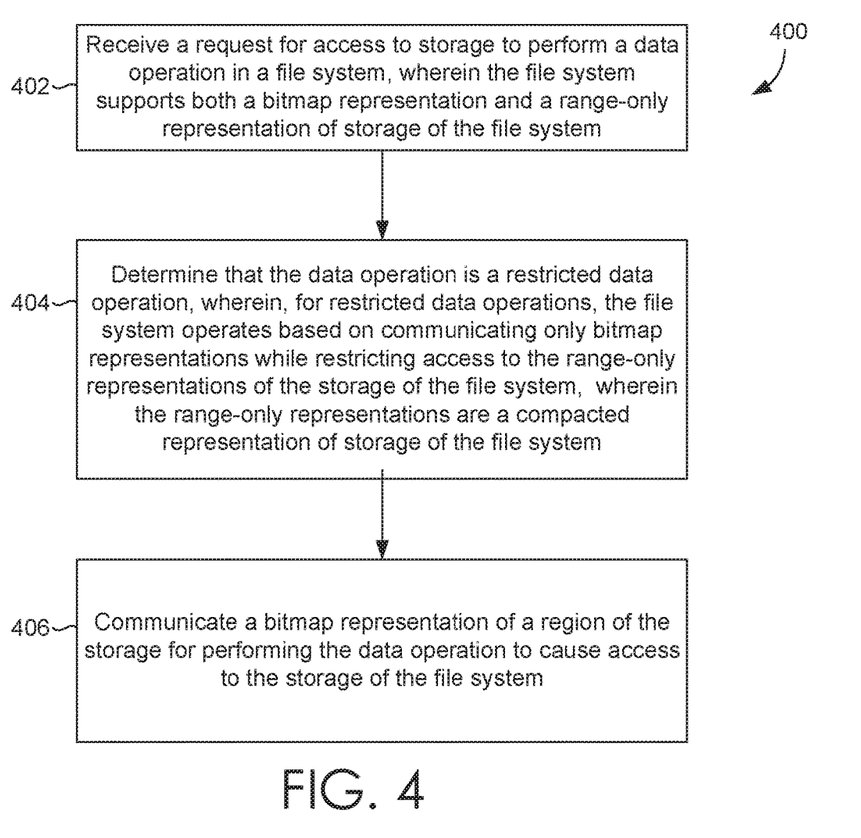
FIG. 4 provides a second exemplary method of providing reduced-latency data operations for files in a file system, in accordance with aspects of the technology described herein.
Figure 5:
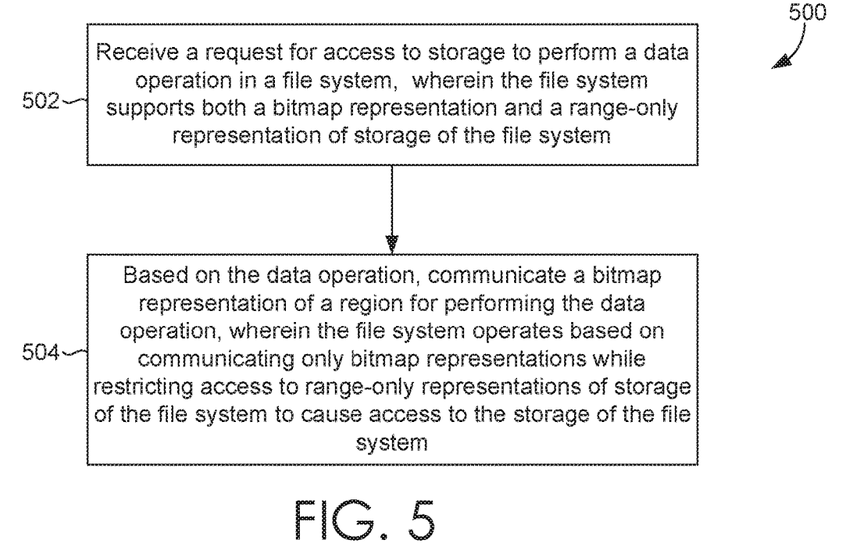
FIG. 5 provides a third exemplary method of providing reduced-latency data operations for files in a file system, in accordance with aspects of the technology described herein.

Exemplary Methods for Providing Reduced-Latency Data Operations for Files in a File System With reference to FIGS. 3, 4 and 5, flow diagrams are provided illustrating methods for performing reduced-latency data operations for files in a file system (technical solution system). The methods may be performed using the technical solution system described herein. In embodiments, one or more computer storage media having computer-executable instructions embodied thereon that, when executed, by one or more processors can cause the one or more processors to perform the methods in the technical solution system.

Turning to FIG. 3, a flow diagram is provided that illustrates a method 300 for performing reduced-latency data operations for files in a file system. Initially at block 302, a request for access to storage to perform a first data operation in a file system is received. The file system supports both a bitmap representation and a range-only representation of storage of the file system. At block 304, based on determining that the first data operation is a restricted data operation, a bitmap representation for a region of the storage for performing the data operation. The data operation is a restricted data operation because of a copy-on-write policy of the file system, and not an unrestricted data operation because an allocator has elevated rights for performing data operations. Restricted data operations are allowed access to only bitmap representations of the storage and unrestricted data operations are allowed access to either the bitmap representation or the range-only representations of the storage of the file system. At block 306, a request to perform a second data operation in the file system is received. At block 308, based on determining that the second data operation is an unrestricted operation, either the bitmap representation or the range-only representation for the region of the storage for performing the second data operation.

Turning to FIG. 4, a flow diagram is provided that illustrates a method 400 for performing reduced-latency data operations for files in a file system. Initially at block 402, a request for access to perform a data operation in a file system is received. The file system supports both a bitmap representation and a range-only representation of storage of the file system. At block 404, it is determined that the data operation is a restricted data operation. For restricted data operations, the file system operates based on communicating only bitmap representations while restricting access to the range-only representations of the storage of the file system. The range-only representations are a compacted representation of storage of the file system. At block 406, the bitmap representation of a region for performing the data operation is communicated.

Turning to FIG. 5, a flow diagram is provided that illustrates a method 500 for performing reduced-latency data operations for files in a file system. Initially at block 502, a request for access to perform a data operation in a file system is received. The file system supports both a bitmap representation and a range-only representation of storage of the file system. At block 504, a bitmap representation of a region for performing the data operation is communicated. For the data operation, the file system operates based on communicating only bitmap representations while restricting access to range-only representations of the storage of the file system.

Example File System Environment

Figure 6:
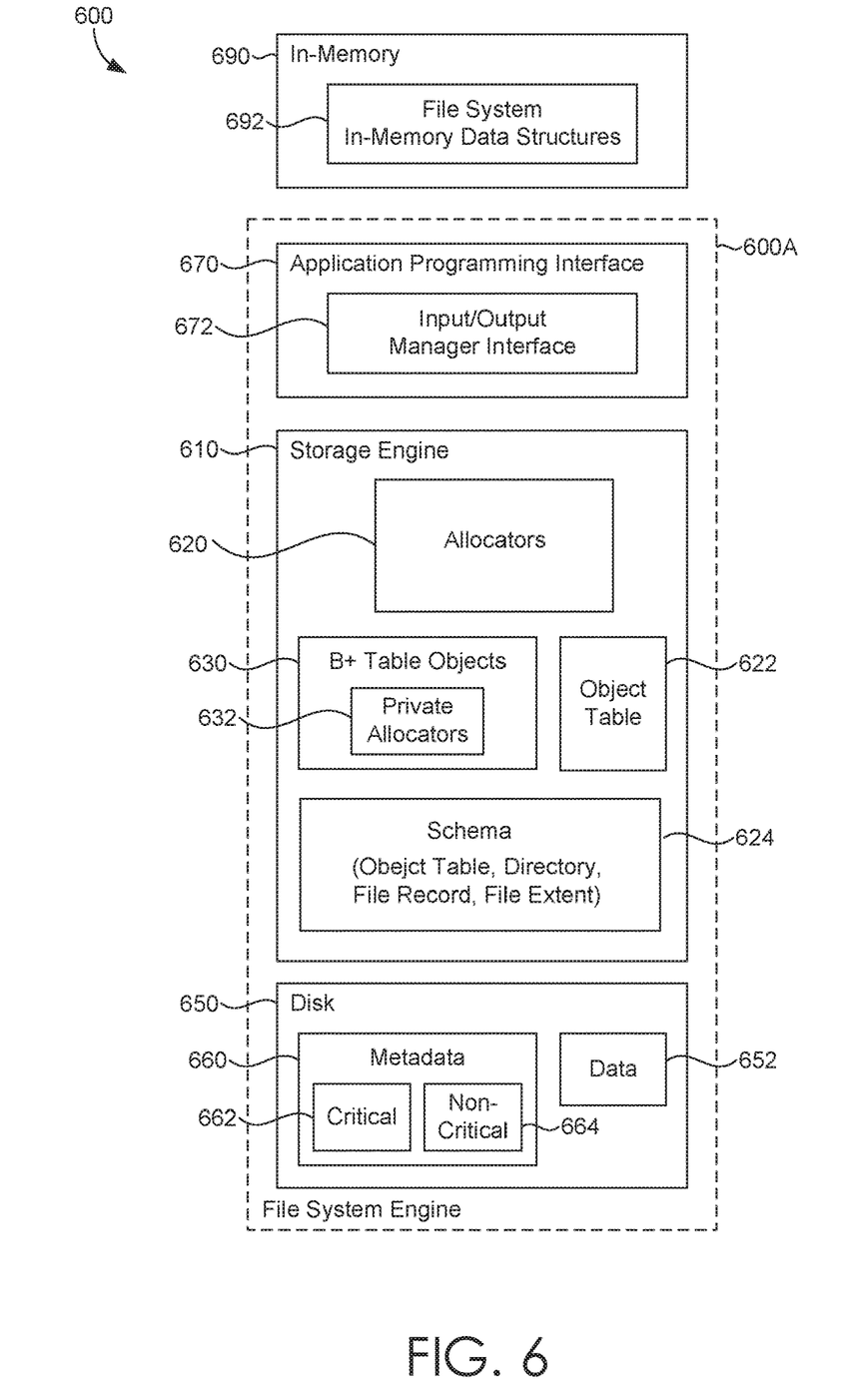
FIG. 6 provides a block diagram of an exemplary file system environment suitable for use in implementing aspects of the technology described herein.

With reference to the file system environment 600 that includes a file system (e.g., Resilient File System—ReFS), embodiments described herein support the functionality of the technical solution described above. The file system environment 600 includes distributed components of the file system that are communicatively implemented in combination with other integrated components that implement aspects of the technical solution. The file system environment 600 refers to the hardware architecture and software framework that support the functionality of the technical solution.

At a high level, the file system provides configuration rules (e.g., logic and data structures) used to manage storage and retrieval, and naming and grouping of data. In particular, the configuration rules are based on a copy-on-write (i.e., write-to-new) design. In this regard, the file system is a copy-on-write file system. In particular, an application programming interface operates with a storage engine to provide a write-to-new B+ key-value file system. The file system can support data integrity, file-level snapshots ("block cloning"), data tiering and dynamic layout on disks, among other functionality.

FIG. 6 shows a high level architecture file system environment 600 having components in accordance with implementations of the present disclosure. It should be understood the arrangement described herein is set forth only as examples and other arrangements, instead of those shown, are contemplated. Among other components not shown, the file system environment 600 includes file system engine 600A having storage engine 610, disk 650, application programming interface 670, and in-memory 690. The storage engine 610 includes allocators 620, object table 622, and schema 624, B+ table objects 630 (with private allocators 632), and disk 650 includes files 652, and metadata 660 (with critical (metadata) 662, non-critical (metadata) 664); API 670 includes input/output manager interface 672; and in-memory 690 having file system in-memory data structures 692.

The storage engine 610 provides allocators (e.g., global allocators and private allocator) that allocate storage of table objects. In particular, the storage engine 610 provides B+ table objects 630 with internal private allocators 632, and an object table 622 to track the B+ table objects. The storage engine 610 supports storing roots of one B+ table within another B+ table and supports stream extents. Storing roots of B+ tables within another can leave the embedded table unable to have an entry in the object table. Directories are B+ table objects referenced by the object table 622. Files are B+ tables whose roots are embedded in the row of directories. Streams are implemented as a table of file extents whose roots are embedded in the file record.

In operation, the file system creates and manipulates B+ table objects in order to store file system metadata (e.g., critical and non-critical metadata) and uses the stream extent functionality for user stream data. In particular, the file system implements two types of metadata (i.e., global "critical" metadata 662 and non-critical metadata 664). Critical metadata 662 is managed independently of non-critical metadata 664. For example, writing critical metadata 662 is based on a different logic from the non-critical metadata 664 based on the separation from the critical metadata. Writing metadata may be implemented based on a locking mechanism.

The storage engine 610 supports a schema 624 for organizing information (e.g., B+ tables of files and directories) in the file system. For example, when a B+ table is created, the table object is assigned an ID in the object table. Every entry is a <key, value> pair in the form <object_id, root_location> where object_id is the volume-unique identifier of the object and root_location is the block address of the root bucket of the table. Because all directories are durable table objects in file system, the vast majority of entries in the object table refer to directories.

Directories are B+ table objects that are responsible for a single, flat namespace. Directories logically contain files, links to files in other directories, and links to other directories. It is through directories and links to directories that the traditional hierarchical file system namespace is built. Rows in a directory table are logically of the form <key, <type, value>> where key is unique in the table, type indicates the way in which value should be interpreted, and value is then type-specific. Directories, being tables, are composed of rows.

Files 652 are stored in association with directories. For example, files 652 may have file records that are B+ tables rooted in a directory B+ table. Files in directories can appear as <key, value> pairs of the form <file_name, file_record>. In one implementation, file_name can be a Unicode string and file_record is an embedded B+ table. Embedded B+ tables in storage engine may embed only their roots in the value of another table. In this regard, a file_record is constructively the root of a table.

In-memory data structures of the file system support in-memory operations and other associated operations of the file system. At a high level, in-memory processing can be based on file objects, file control blocks (FCB) and stream control blocks (SCB). In particular, a file object points to the SCB data structure which represents a single data entity contained in a single file. The file that contains the data entity is represented by a file control block. Durable changes for the SCB and the FCB are supported using a B+ table. Every open file in file system can be implemented with a single FCB as its in-memory anchor. An open file with a single data stream also has an SCB representing that stream. The FCB, being responsible for the on-disk file record, points to the open storage engine B+ table object that represents the file. In this regard, files are B+ tables, while file attributes are rows in the B+ table.

The file system API 670 is an application programming interface through which services of the file system can be requested. For example, the input/output manger interface 672 can support read operations, write operations, metadata management operations, and maintenance operations (e.g., creating or initializing a file system, verifying the file system for integrity, and defragmentation). An operating system of a device using the file system can provide the API to support the file system operations. It is contemplated by various features of the technical solution of the present invention can be performed using file system environment 600 and other variations and combinations thereof.

Example Distributed Computing Environment

Figure 7:
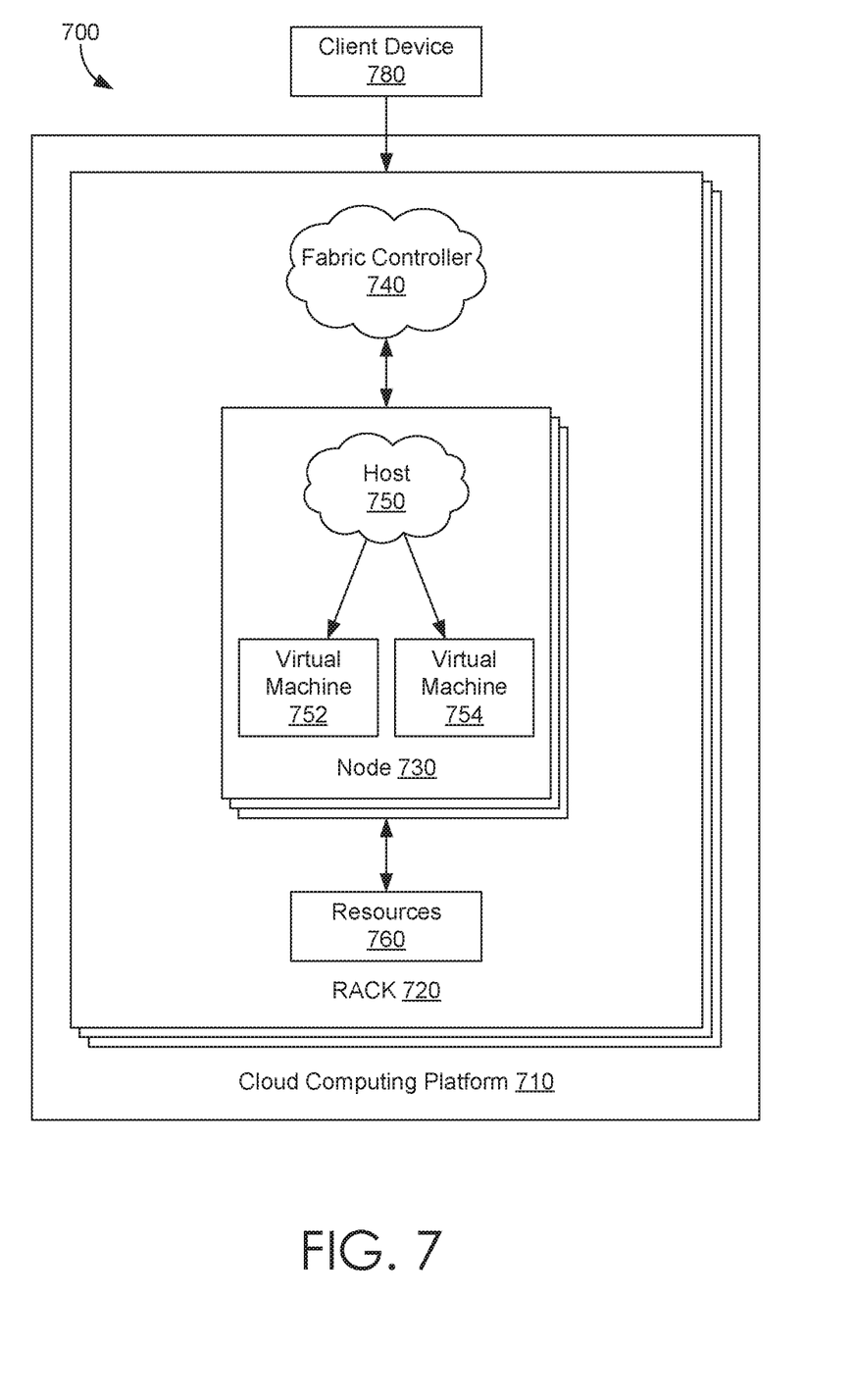
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Figure 8:
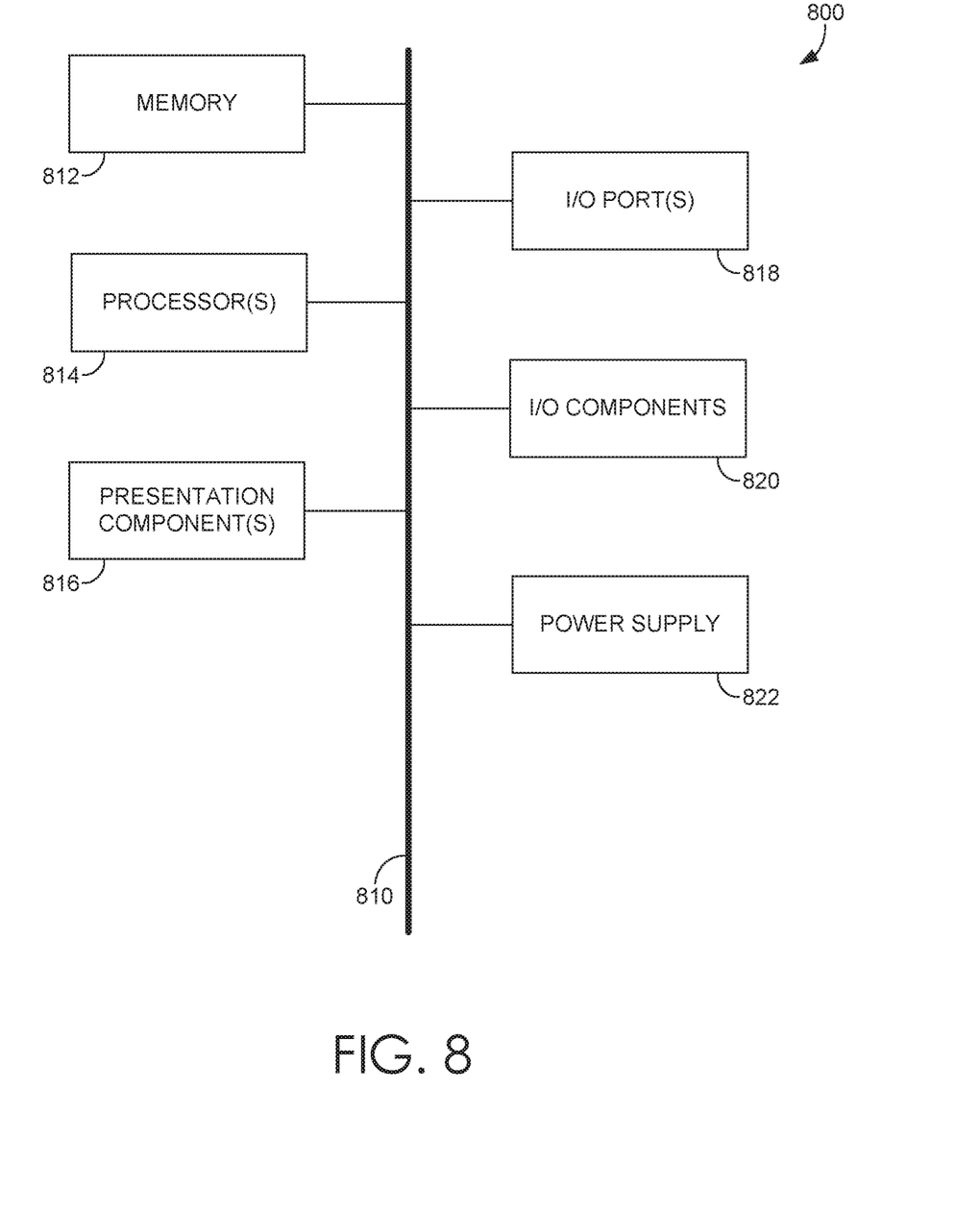
FIG. 8 is a block diagram of an exemplary computing environment suitable for use in implementing aspects of the technology described herein.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).
Example Operating Environment Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including IO components 820, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computing system for providing reduced-latency data operations in a file system, the system comprising:
   a processor; and
   computer storage media storing computer-useable instructions that, when executed by the processor, cause the processor to execute operations comprising:
      receiving a request for access to a region of storage of the file system to perform a data operation, wherein:
         the file system supports both a bitmap representation for the region of the storage and a range-only representation for the region of the storage;
         the bitmap representation for the region of the storage and the range-only representation for the region of the storage are in-memory representations of the storage as tables on disk;
         the bitmap representation for the region of the storage comprises a plurality of bits representing corresponding clusters in the region of the storage; and
         the range-only representation for the region of the storage comprises a single bit indicating the region of the storage is fully allocated or fully free;
      providing an allocator of the file system access to the range-only representation for the region of the storage;
      determining that the data operation is a restricted data operation due to a copy-on-write policy of the file system;
      in response to determining that the data operation is the restricted data operation due to the copy-on-write policy of the file system, allowing access to the bitmap representation for the region of the storage while restricting access to the range-only representation for the region of the storage;
      in response to allowing access to the bitmap representation for the region of the storage while restricting access to the range-only representation for the region of the storage, communicating the bitmap representation for the region of the storage for performing the restricted data operation; and
      based on the communication of the bitmap representation for the region of the storage, cause access to the storage of the file system for performing the restricted data operation.

2. The computing system of claim 1, wherein the tables comprise B+ tables.

3. The computing system of claim 1, wherein the operations further comprise converting the range-only representation for the region of the storage to the bitmap representation for the region of the storage based on the region of the storage being fully allocated or fully free.

4. The computing system of claim 1, wherein the communicating the bitmap representation for the region of the storage causes a drop of at least one lock associated with the request for access to the region of the storage to perform the data operation.

5. The computing system of claim 1, wherein:
   the bitmap representation for the region of the storage cannot be converted to the range-only representation for the region of the storage unless a global exclusive drain has been acquired and there is no bitmap lock; and
   the bitmap representation for the region of the storage comprises a bitmap lock that restricts access to the region of the storage.

6. Computer storage media having computer-executable instructions embodied thereon that, when executed, by a processor, cause the processor to provide reduced-latency data operations in a file system, the operations comprising:
   receiving a request for access to a region of storage of the file system to perform a data operation, wherein:
      the file system supports both a bitmap representation for the region of the storage and a range-only representation for the region of the storage;
      the bitmap representation for the region of the storage and the range-only representation for the region of the storage are in-memory representations of the storage as tables on disk;
      the bitmap representation for the region of the storage comprises a plurality of bits representing corresponding clusters in the region of the storage; and
      the range-only representation for the region of the storage comprises a single bit indicating the region of the storage is fully allocated or fully free;
   providing an allocator of the file system access to the range-only representation for the region of the storage;
   determining that the data operation is a restricted data operation due to a copy-on-write policy of the file system;
   in response to determining that the data operation is the restricted data operation due to the copy-on-write policy of the file system, allowing access to the bitmap representation for the region of the storage while restricting access to the range-only representation for the region of the storage;
   in response to allowing access to the bitmap representation for the region of the storage while restricting access to the range-only representation for the region of the storage, communicating the bitmap representation for the region of the storage for performing the restricted data operation; and
   based on the communication of the bitmap representation for the region of the storage, cause access to the storage of the file system for performing the restricted data operation.

7. The computer storage media of claim 6, wherein the tables comprise B+ tables.

8. The computer storage media of claim 6, wherein the operations further comprise converting the range-only representation for the region of the storage to the bitmap representation for the region of the storage based on the region of storage being fully allocated or fully free.

9. The computer storage media of claim 6, wherein the communicating the bitmap representation of the region of the storage causes a drop of at least one lock associated with the request for access to the region of storage to perform the data operation.

10. The computer storage media of claim 6, wherein:
the bitmap representation for the region of the storage cannot be converted to the range-only representation for the region of the storage unless a global exclusive drain has been acquired and there is no bitmap lock; and
the bitmap representation for the region of the storage comprises a bitmap lock that restricts access to the storage.

11. A computer-implemented method for providing reduced-latency data operations in a file system, the method comprising:
receiving a request for access to a region of storage of the file system to perform a data operation, wherein:
the file system supports both a bitmap representation for the region of storage and a range-only representation for the region of storage;
the bitmap representation for the region of the storage and the range-only representation for the region of the storage are in-memory representations of the storage as tables on disk;
the bitmap representation for the region of the storage comprises a plurality of bits representing corresponding clusters in the region of the storage; and
the range-only representation for the region of the storage comprises a single bit indicating the region of the storage is fully allocated or fully free;
providing an allocator of the file system access to the range-only representation for the region of the storage;
determining that the data operation is a restricted data operation due to a copy-on-write policy of the file system;
in response to determining that the data operation is the restricted data operation due to the copy-on-write policy of the file system, allowing access to the bitmap representation for the region of the storage while restricting access to the range-only representation for the region of the storage;
in response to allowing access to the bitmap representation for the region of the storage while restricting access to the range-only representation for the region of the storage, communicating the bitmap representation for the region of the storage for performing the restricted data operation; and
based on the communication of the bitmap representation for the region of the storage, cause access to the storage of the file system for performing the restricted data operation.

12. The computer-implemented method of claim 11, wherein the tables comprise B+ tables.

13. The computer-implemented method of claim 11, further comprising converting the range-only representation for the region of the storage to the bitmap representation for the region of the storage based on the region of storage being fully allocated or fully free.

14. The computer-implemented method of claim 11, wherein:
the bitmap representation for the region of the storage cannot be converted to the range-only representation for the region of the storage unless a global exclusive drain has been acquired and there is no bitmap lock and the bitmap representation for the region of the storage comprises a bitmap lock that restricts access to the storage.

15. The computing system of claim 1, wherein access to the range-only representation for the region of the storage is provided to the allocator of the file system to organize information within the file system.

16. The computer storage media of claim 6, wherein access to the range-only representation for the region of the storage is provided to the allocator of the file system to organize information within the file system.

17. The computer-implemented method of claim 11, wherein access to the range-only representation for the region of the storage is provided to the allocator of the file system to organize information within the file system.

\* \* \* \* \*